(12) United States Patent
Nishimura et al.

(10) Patent No.: US 8,284,648 B2
(45) Date of Patent: Oct. 9, 2012

(54) OPTICAL DISK RECORDING APPARATUS

(75) Inventors: Koichiro Nishimura, Yokohama (JP); Junya Iizuka, Yokohama (JP); Manabu Katsuki, Yokohama (JP); Takakiyo Yasukawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1316 days.

(21) Appl. No.: 11/940,392

(22) Filed: Nov. 15, 2007

(65) Prior Publication Data

US 2008/0112289 A1 May 15, 2008

(30) Foreign Application Priority Data

Nov. 15, 2006 (JP) ................................. 2006-308543

(51) Int. Cl.
*G11B 27/30* (2006.01)
*G11B 3/00* (2006.01)

(52) U.S. Cl. ............. 369/59.22; 369/59.21; 369/124.05; 369/59.11; 369/59.19

(58) Field of Classification Search ............. 369/112.01, 369/53.3, 59.22
See application file for complete search history.

(56) References Cited

U.S. PATENT DOCUMENTS

| 2004/0100883 | A1* | 5/2004 | Sakagami | 369/47.35 |
| 2005/0122878 | A1* | 6/2005 | Baba | 369/59.22 |
| 2006/0092804 | A1* | 5/2006 | Otake et al. | 369/59.22 |
| 2006/0285468 | A1* | 12/2006 | Katsuki | 369/59.22 |
| 2008/0291797 | A1* | 11/2008 | Tamaki | 369/47.52 |
| 2009/0122673 | A1 | 5/2009 | Nakamura et al. | |

FOREIGN PATENT DOCUMENTS

| JP | 2002-150686 | 5/2002 |
| JP | 2003-006864 | 1/2003 |
| JP | 2005-339690 | 12/2005 |
| WO | WO 2006/112277 | 10/2006 |

* cited by examiner

*Primary Examiner* — Wayne Young
*Assistant Examiner* — Dionne Pendleton
(74) *Attorney, Agent, or Firm* — Antonelli, Terry, Stout & Kraus, LLP

(57) ABSTRACT

An optical disk apparatus is provided that has a signal processing circuit for equalizing a signal so as to achieve predetermined equalization, in which interference between codes is permitted, by means of an adaptive equalization circuit or the like, and for performing binarization by means of a maximum likelihood decoding circuit in which interference is performed as a rule, and thereby achieves stabilized signal reproduction in a narrow-band transmission. When evaluating the quality of the recorded signal through the use of the recording parameter learning and the reproduction system such as recorded signal verification, the optical disk recording apparatus is capable of highly precisely evaluating the quality of the recorded signal by fixing a circuit characteristic after suspending the optimization operation of the adaptive equalization circuit or the like for optimizing the characteristic by the reproduced signal. An optical disk recording method is also provided.

10 Claims, 13 Drawing Sheets

|  | PERTINENT MARK | | |
|---|---|---|---|
| PRECEDING SPACE | | 2T | 3T | 4T |
| | 2T | -30 | -20 | -15 |
| | 3T | -25 | -18 | -13 |
| | 4T | -20 | -16 | -12 |
| | 5T OR MORE | -18 | -15 | -10 |

| TIME T | 0 | 1 | 2 | 3 | EQUALIZATION OUTPUT |
|---|---|---|---|---|---|
| 801 TARGET BINARIZED WAVEFORM(1) | -1 | -1 | 1 | 1 | 0 |
| 803 EDGE WITH A LARGE DEVIATION TOWARD FORWARD DIRECTION(2) | -1 | -0.2 | 0.8 | 1 | 1.2 |
| 805 EDGE WITH A SLIGHT DEVIATION TOWARD FORWARD DIRECTION(3) | -1 | -0.4 | 0.6 | 1 | 0.4 |
| 806 EDGE WITH A LARGE DEVIATION TOWARD BACKWARD DIRECTION(4) | -1 | -0.8 | 0.2 | 1 | -1.2 |

| KIND | ADDRESS | TAP COEFFICIENT | | | |
|---|---|---|---|---|---|
| | | TAP 0 | TAP 1 | ... | TAP N |
| DISK A / VELOCITY 1 | 0*h | 1 | 0 | ... | -1 |
| DISK A / VELOCITY 2 | 1*h | 1 | 2 | ... | -2 |
| DISK B / VELOCITY 1 | 2*h | -2 | 0 | ... | 2 |
| DISK B / VELOCITY 2 | 3*h | -3 | -1 | ... | 3 |
| DISK B / VELOCITY 3 | 4*h | -5 | -2 | ... | 4 |
| ... | ... | ... | ... | ... | ... |

OPTICAL DISK RECORDING APPARATUS

CLAIM OF PRIORITY

The present application claims priority from Japanese application JP-2006-308543 filed on Nov. 15, 2006 the content of which is hereby incorporated by reference into this application.

BACKGROUND OF THE INVENTION

The present invention relates to an optical disk apparatus for optically recording information on an optical disk through the use of laser light and to an optical disk recording method used in the optical disk recording apparatus.

In the optical disk apparatus for recording data in the optical disk using laser light and reproducing binarized information from the optical disk, when recording the data, recording parameter learning is required for optimally adjusting the power and timing of a recording laser pulse (hereinafter referred to as "record strategy")

In the recording parameter learning, the quality of the record is evaluated based on the quality of reproduced recorded data. In this event, if data recording velocity differs from data reproducing velocity, every time switching is performed between the recording and reproduction, the rotational velocity has to be changed, posing problems including the generation of heat incident to the variation of torque of a spindle motor for rotating the optical disk as well as the occurrence of a waiting time before a spindle motor rotates with a desired number of rotations. In order to prevent this, it is preferable to equalize the velocity at which to record the data of the recording parameter learning to that at which to reproduce the data of the recording parameter learning.

The frequency characteristic of a reproduction system that is formed of a photoelectric conversion circuit for converting reproduction light from the optical disk into an electrical signal, an electric signal transmission circuit, a processing circuit or the like is limited. Therefore, as the reproduction velocity of the optical disk becomes higher and the frequency of the binarized information becomes higher, signal amplitude and signal SN ratio decrease, or interference occurs between signal codes, thus causing errors in the determination of binarized signals during reproduction.

In other words, there is a problem that when trying to reproduce data at the same velocity as recording velocity in high speed recording and to evaluate the quality thereof, the waveform sometimes exhibits distortion due to the lack of a signal transmission band. One of the indexes for evaluating the record quality is a jitter that indicates the fluctuation of an edge position of a reproduced signal, which is information reproduced after being recorded in the optical disk. When the waveform exhibits the distortion, however, it becomes difficult to correctly detect jitters from the reproduced signal.

As a method of reducing error in determining binarized signal during the reproduction, PRML (Partial Response and Maximum Likelihood) processing is well known. The PRML is a method of adaptively equalizing the signal reproduced from the optical disk such that it reaches a known PR (Partial Response) class in which interference between codes is permitted, and estimating a signal sequence that looks most definite by means of ML (Maximum Likelihood) that follows the equalization target of the PR class and determining the binarization. Moreover, according to the PRML, a binarized signal can be reproduced in a stable manner even when the band of the reproduction system is low relative to the band of the reproduced signal. As a method of determining the record quality when the PRML processing is used, methods are proposed that determine the record quality from a difference value from the PR equalization target (refer to Japanese Laid-open Patent Applications 2003-006864, and 2005-339690)

SUMMARY OF THE INVENTION

The PRML processing uses the adaptive equalization circuit to equalize the reproduced signal to have a desired characteristic. When the adaptive equalization circuit is used to reproduce the recoded data having many jitters (recorded data with low record quality), the adaptive equalization circuit is operated to equalize the recorded data to have a desired characteristic by canceling the jitters of the adaptive equalization circuit. In other words, the record quality evaluation methods described in the above Japanese Laid-open Patent Applications 2003-006864, and 2005-339690 can not determine that the record quality is low, and thereby there arises a problem that the methods described in the above Japanese Laid-open Patent Applications can not appropriately evaluate the record quality by the learning record.

The process of evaluating the record quality includes a verification operation in addition to the above described recording parameter learning. The verification operation guarantees a certain record quality by evaluating the record quality by recording a certain signal on a data region of an optical disk and thereafter reproducing the signal, and ensures that a signal is recorded, reproduced and compatible between different optical disk apparatuses. However, there is also a problem during the verification operation that while the signal recording velocity has to be equalized to the signal reproducing velocity due to the same reason as that described above, the configuration of conventional apparatuses can not appropriately evaluate the record quality.

The present invention solves the foregoing problems.

The foregoing problems are solved by the invention described in the claim.

With the present invention, it becomes possible to evaluate the record quality in a more stable manner and to adjust the record parameter using the same. This enables reducing heat generation which is caused by an increased load on a motor which changes velocity during reproduction and reducing the generation of a waiting time before the rotation is set when changing the velocity, thus making it possible to implement highly reliable high-speed recording parameter learning processing that reproduces data with the same velocity as that of recording data, and high-speed record verification operation processing.

Other objects, features and advantages of the invention will become apparent from the following description of the embodiments of the invention taken in conjunction with accompanying drawings.

DETAILED DESCRIPTION OF THE INVENTION

The present invention will be described in the following sections with reference to appended drawings.
(Embodiment 1)
The record strategy will be described with reference to FIG. 2 and FIG. 3.

Figure 2:
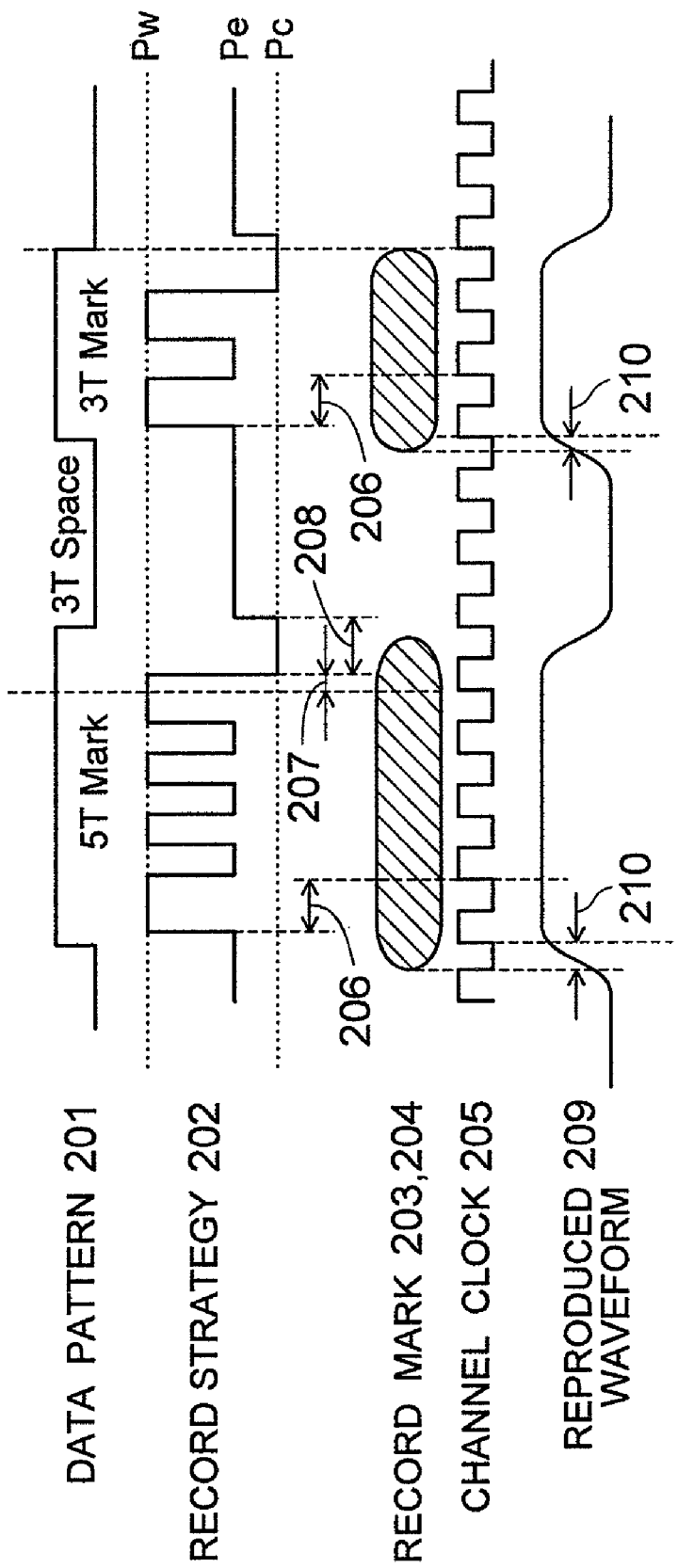
FIG. 2 is a schematic diagram showing the relationship among a record strategy, marks and spaces on the optical disk, and a reproduced waveform thereof.

FIG. 2 is a diagram showing an example of a laser drive waveform for recording information on the optical disk and an example of mask formation. 201 is a recording data pattern (hereinafter referred to "record data"), which is illustrated by an NRZI signal here. 202 is a record strategy for recording the record data. This record strategy allows marks (203, 204) and a space therebetween to be formed on a recording film of the optical disk. 205 is a channel clock for controlling the recording or reproduction, while 209 is a waveform reproduced from the marks 203, 204.

Optimum laser power and optimum timing for recording marks on the optical disk differ depending on the kind of optical disks or combined conditions of the optical disks. The kind of optical disks includes CD-R, CD-RW, DVD-R, DVD-RW, DVD-RAM, DVD+R, DVD+RW, BD-R, BD-RE, HD DVD-R, HD DVD-RW, HD DVD-RAM, and the like. The condition of the optical disk apparatus includes, for example, a build-up characteristic of a laser, and laser spot diameter on the optical disk. Moreover, if a thermal interference by laser light during the mark formation is considered, it is also necessary to control the laser power and the timing of laser pulse according to the length of the mark to be recorded and the length of the space before and after the mark.

Therefore, every time an optical disk is loaded into the optical disk apparatus, recording parameter learning for seeking an optimum record parameter (optimum laser power and optimum laser pulse timing) is performed between the optical disk and optical disk apparatus.

The laser power parameter for performing learning when recording data on a rewritable optical disk includes a record power Pw, an erase power Pe, and a cooling power Pc. The laser pulse timing for performing the learning includes timings (206, 207) from a predetermined clock edge until a pulse edge to be controlled, and a laser pulse edge width (208).

While the learning of timing 206 for controlling the front edge of the mark is provided for the purpose of description in the following section, it goes without saying that the learning of the record parameter of the timing 207 and laser pulse edge width 208 can also be performed simultaneously.

Figures 3, 4:
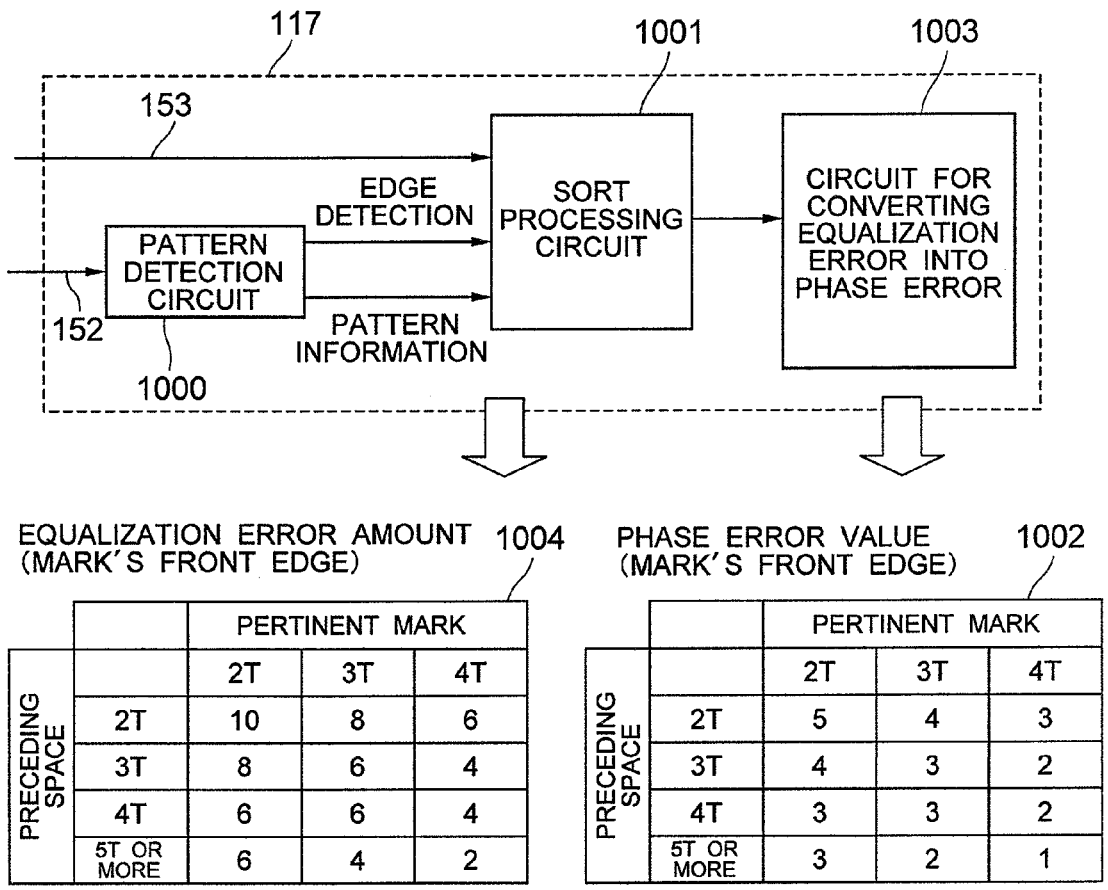
FIG. 3 is diagram showing an exemplary record parameter table.
FIG. 4 is a diagram showing the configuration of the phase error detection circuit according to the embodiment 1.

FIG. 3 shows an exemplary timing learning table of the timing 206. In FIG. 3, "pertinent Mark" indicates the length of mark to be recorded by the optical disk apparatus, while "preceding Space" indicates the length of the space preceding the pertinent marks. Each value in the table indicates the amount of deviation (referred to as "control amount") from a reference position of a front edge of the mark corresponding to the combination of the pertinent mark and preceding space. The control amount is previously provided from disk manufacturers or the like, and it is possible to use FIG. 3 to determine the control amount of the timing 206 shown in FIG. 2. However, the control amount of the timing 206 in FIG. 3 provided by the manufacturers or the like is not optimal to every optical disk apparatus. Therefore, adjustment is required.

An optimum value for the control amount of timing 206 is a value in which a time shift 210 relative to a channel clock of the reproduced waveform 209 becomes minimal. Therefore, if the control amount is controlled with the value in which the time shift 210 becomes minimal as a target value according to the combination of the "pertinent Mark" and "preceding Space," then it is possible to enlarge the margin relative to the edge displacement due to the influence of thermal interference during the record mark formation or the like. In the present embodiment, when an optical disk is loaded into an optical disk apparatus, the control amount is determined through the combination of the optical disk and optical disk apparatus thereof by evaluating the quality of reproduced record data for each combination of the "pertinent Mark" and "preceding Space," and subsequently performing recording parameter learning of the control amount of the timing 206.

Next, the configuration of the optical disk apparatus according to an embodiment 1 will be described with reference to FIG. 1. A laser light emitted from a laser 108 is irradiated onto a specified position in the radius through a collimating lens 105 and an objective lens 103. The reflected light of the laser light is condensed by a condenser lens 107 via a beam splitter 104 and converted into an electrical signal (hereinafter "signal") by a photoelectric conversion element 107. The obtained signal undergoes amplitude conversion by an amplifier 109, voltage conversion, or the like, and is subsequently inputted into an adaptive equalization circuit 1301.

The adaptive equalization circuit 1301 adapts an equalization characteristic (specifically a tap coefficient during adaptive equalization) based on an equalization error signal 153, which is an output of an equalization error detection circuit 116, such that PRML decoding processing has an optimum equalization characteristic. An equalized signal 151, which is an output of the adaptive equalization circuit 1301, is inputted into a maximum likelihood decoding circuit 111. The maximum likelihood decoding circuit 111 follows the equalization characteristic, which is previously given by the adaptive equalization circuit 1301, to generate a binarized signal 152 from the equalized signal 151. The binarized signal 152 is decoded into an information signal by a decoding circuit 112 and then transmitted to a higher level host 115 via a microcomputer 114.

The equalization error signal 153 is also imputed into a phase error detection circuit 117. The phase error detection circuit 117 classifies the values of the equalization error signal 153 by the kind of the binarized signal 152, converts them into phase error information for transmission to a record strategy generation circuit 118. A modulation circuit 120 modulates the record information transmitted from the higher level host 115 to output record data 154. The record strategy generation circuit 118 generates a record strategy for controlling the laser pulse based on the inputted phase error information and record data 154.

A laser driver 113 supplies the laser 108 with a laser drive current pulse 119 that is generated following the inputted record strategy. The microcomputer 114 controls above mentioned circuits and a spindle motor 102.

An exemplary configuration of the phase error detection circuit 117 is shown in FIG. 4. A pattern detection circuit 1000 detects edge points and the length in a channel clock unit of spaces and marks which are forming the edges from the binarized signal 152, determines data patterns, and transmits edge detection timing information and pattern information to a sort processing circuit 1001.

The sort processing circuit 1001 sorts the values of the equalization error signals 153 at an edge timing for each combination of the "pertinent Mark" and "preceding Space" according to the pattern detection information (e.g., error information of the front edge of the mark) transmitted from the pattern detection circuit 1000 as indicated in an equalization error amount table 1004. A phase error conversion circuit 1003 generates a phase error table 1002 from the equalization error amount table 1004. The conversion processing from the equalization error amount table 1004 into the phase error table 1002 in the phase error conversion circuit 1003 is described in detail later.

Figures 5, 6:
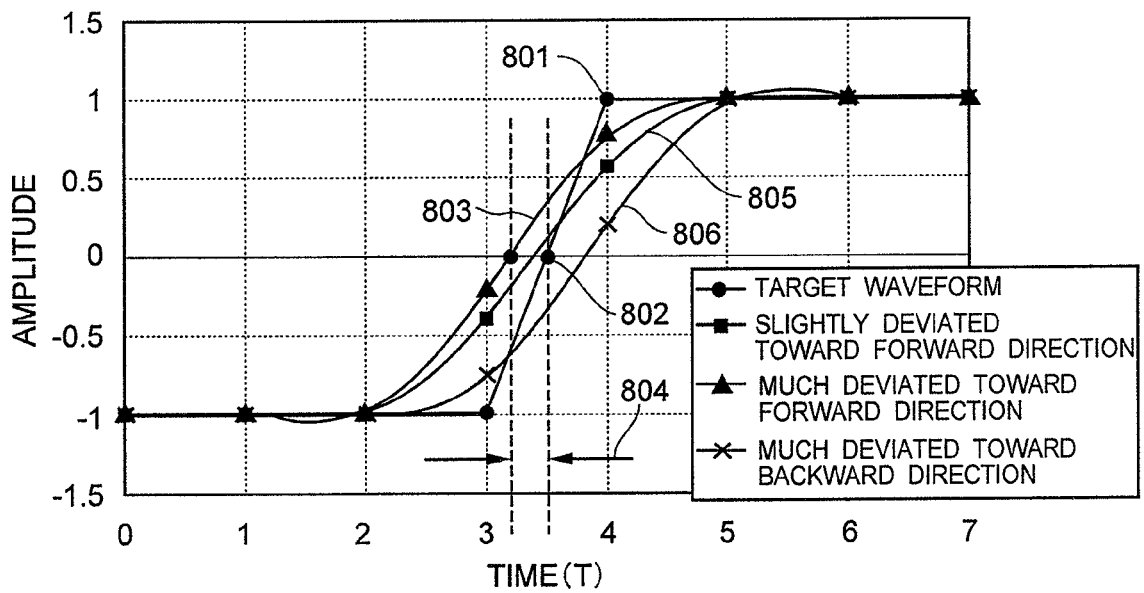
FIG. 5 is a diagram showing an example of waveform inputted into a waveform equalization circuit.
FIG. 6 is a table showing equalization error for each inputted waveform of FIG. 5.

Waveforms that are inputted into the adaptive equalization circuit 1301 are shown in FIG. 5. Outputs, in which waveforms inputted into the adaptive equalization circuit 1301 are equalized by PR (1, 2, 2, 1), are shown in FIG. 6. It should be noted that 801 of FIG. 5 is a target waveform, and 803 is a waveform when a waveform edge is greatly deviated from the waveform 801 in the forward portion of time axis. The difference 804 between a zero cross point 802 of the target waveform 801 and a zero cross point of the waveform 803 at this time is the phase error amount. 805 is a waveform deviated by a small amount in the forward portion, while 806 shows a waveform greatly deviated in the backward portion.

Equalized output values of four kinds of input waveforms that are introduced in FIG. 5 are shown in FIG. 6. (1) (2) (3) and (4) of FIG. 6 are equalized outputs that correspond to the target waveform 801, waveform 803, waveform 805 and waveform 806, respectively. The equalization error of each equalized output is indicated by the difference from the equalized output 0 of the target waveform (1). The equalization error of the waveform 803 is 1.2. The equalization error of the waveform 805 is 0.4. The equalization error of the waveform 806 is −1.2. As indicated here, the value of the phase error and the value of the equalization error are in a proportional relation, and it can be seen that the polarity of a phase error is kept out of the polarity of the phase error and positive and negative polarity of the equalization error. The phase error conversion circuit 1003 uses this relation to convert the equalization error into the phase error.

Figure 7:
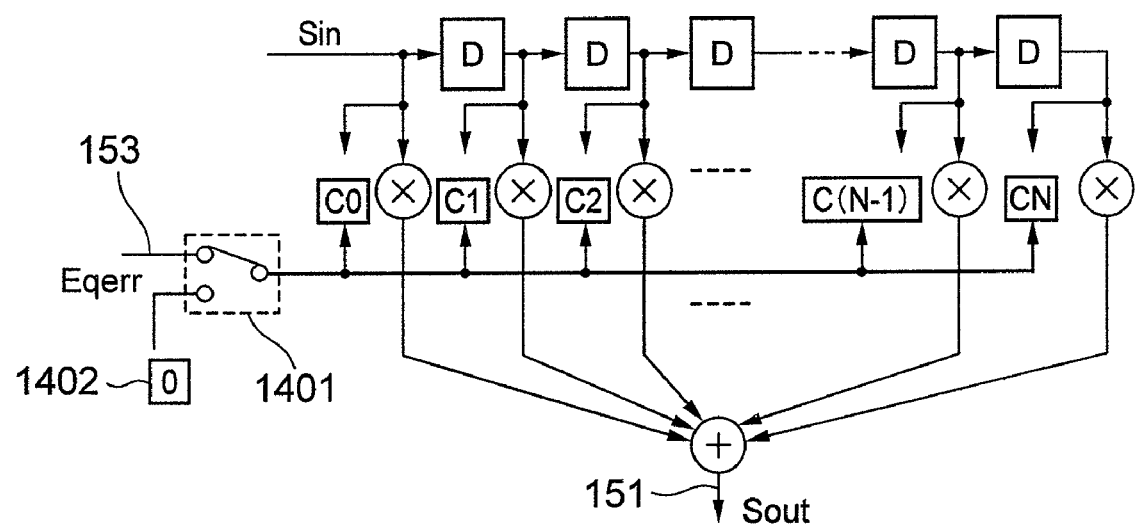
FIG. 7 is a filter configuration diagram of an adaptive equalization circuit according to the embodiment 1.

An exemplary configuration of the adaptive equalization circuit 1301 is shown in FIG. 7. C0 to CN are tap coefficients employed in equalizing processing. 1401 is a switch controlled by the microcomputer 114 via a data pass 121. The equalization errors as a result of inputting each tap for calculation processing can be switched by the switch 1401 from an equalization error signal 153 to a zero value 1402. The switch 1401 and zero value 1402 will be described in detail later.

Each tap coefficient of a transversal filter in an arbitrary time is calculated from the tap output and equalization error in each time, and a tap coefficient of one time prior to the pertinent time. A method of least squares, a maximum likelihood descending method or the like can be adopted as a calculation method. However, since they are known technologies, description thereof will be omitted.

In the adaptive equalization circuit 1301, when the reproduced waveform from the optical disk is deformed due to the optical disk tilt along tangent line and radius direction, or the like, the coefficient of each tap converges such that the equalizing characteristic has a characteristic to cancel the deformation. This controls the equalized outputs to have an expected equalizing characteristic (e.g., PR (1, 2, 2, 1) characteristic) at any time regardless of the characteristic of the waveform inputted into the adaptive equalization circuit 1301. The employment of the adaptive equalization circuit 1301 in this manner allows the reproduction characteristic (reproduction margin) relative to reproduction distortion to be enlarged.

However, there arises a problem that even if a phase error occurs during the recording of binarization signals on an optical disk, fluctuation of the tap coefficient caused by the size of recorded binarization signals can not be known, because the adaptive equalization circuit reproduces the binarization signals by converging the tap coefficient such that the combined influence of the phase error and tilt is reduced. In other words, there occurs a problem that record quality of the binarization signals cannot separately be observed.

The record strategy learning processing according to the present embodiment, which is capable of solving the problem, will be described with reference to FIG. 8 and FIG. 9. FIG. 9 shows a record parameter table for the processing of FIG. 8. In FIG. 9, a table 1201 is a record parameter table prior to the record strategy learning processing, 1002 is a phase error table, and 1202 is a record parameter table subsequent to the learning. After the start of the record strategy learning (1101), each tap coefficient of the adaptive equalization circuit 1301 is set to a predetermined value, and the tap coefficient adapting processing based on equalization error outputs is stopped (1501). A method of stopping the tap coefficient learning processing includes a method of fixing a tap coefficient value by switching the switch 1401 of FIG. 7 from equalization error inputting to zero value as to set the error input which is a control value to zero.

Next, a pickup head is moved to a record strategy learning execution area on the optical discs (1102). In the record strategy learning execution area, random pattern data along a modulation rule of the optical disk is recorded (1103). Then, after the recording is finished, the area in which the random pattern data is recorded is reproduced, and a phase error table 1002 corresponding to desired combinations of marks and spaces is generated by the phase error detection circuit 117 (1104).

In a part with a predetermined value or more of phase error amount (e.g., shaded areas in FIG. 9 with phase error amount of 3 or more) of the generated phase error table 1002, the values of the record parameter table 1202 are corrected according to the phase error amount table 1002 (1106), and the random pattern is recorded again (1103).

When the total phase error amount of the phase error table 1002 becomes the predetermined phase error amount or less (1105), the switch 1401 of FIG. 7 is returned to the inputting of the equalization error signal 153, the tap coefficient control (1502) is started, and the record strategy learning is terminated (1107). This enables the use of the adaptive equalization in the data reproduction processing after the record strategy learning.

The use of the foregoing procedure would enable the evaluation of the quality of reproduced signals of the recorded data while the reproduction performance is fixed by holding the tap coefficient, even when signals recorded in the optical disk are PRML-processed in order to reproduce and evaluate the signals at the same speed during the recording parameter learning of high speed recording. With this, even when the PRML processing is adapted to the recording parameter learning, highly precise recording parameter learning values are obtained in the all combinations of the marks and spaces indicated in the record parameter table.

It should be noted that while the adaptive equalization circuit is used as an example of a circuit characteristic control that depends on the reproduced waveform from a pickup head in the present embodiment. Similarly in other waveform processing circuits that control the parameter value depending on the waveform, it is capable of highly precise detection of the phase error of the reproduced waveform for the record strategy learning and realization of stable record strategy learning by stopping the control of the parameter value in the same manner during the strategy learning processing.

(Embodiment 2)

Next, the operation of the optical disk apparatus according to an embodiment 2 of the present invention will be described.

Figure 8:
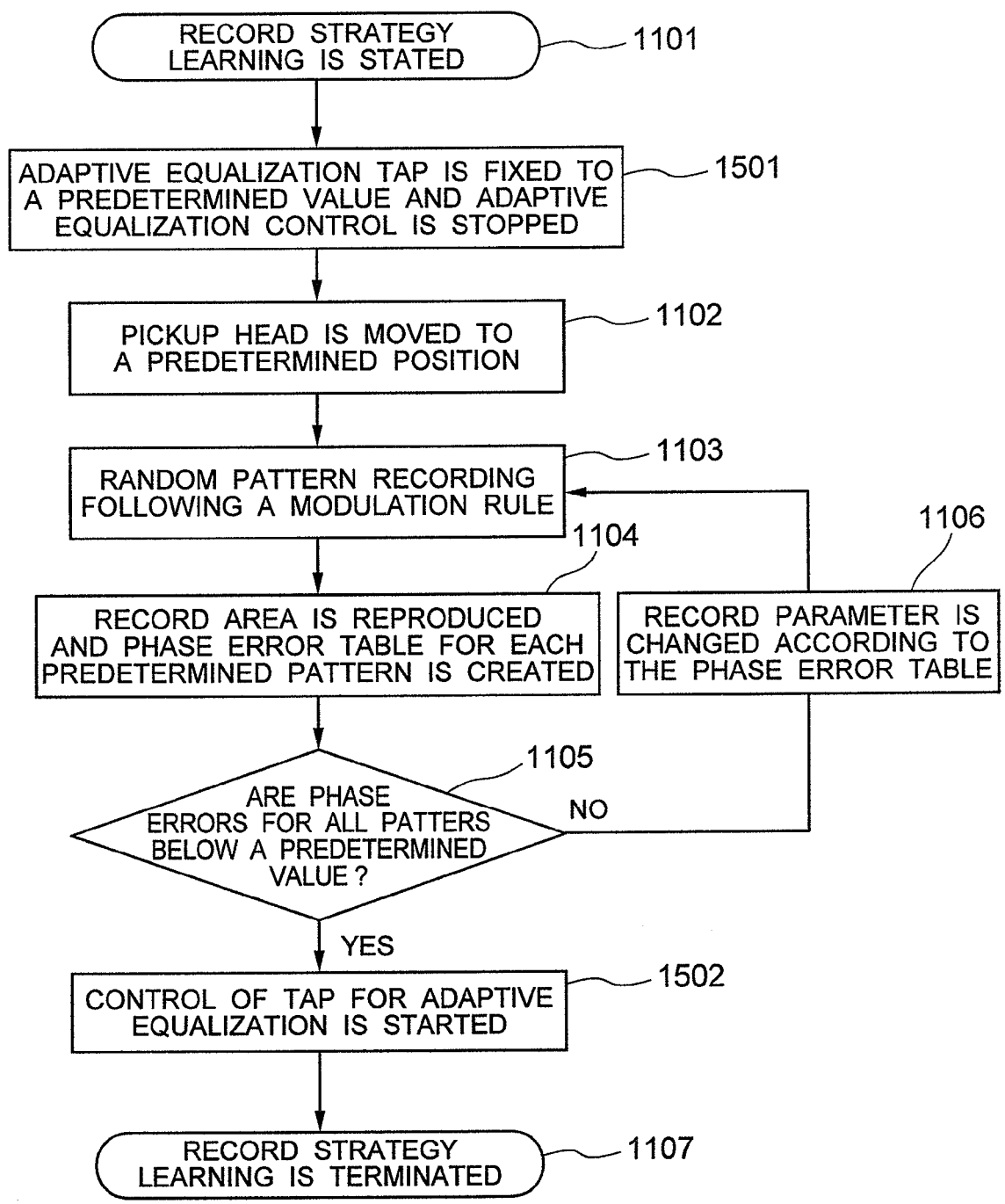
FIG. 8 is a flowchart showing the process flow of the record strategy learning according to the embodiment 1.
Figure 9:
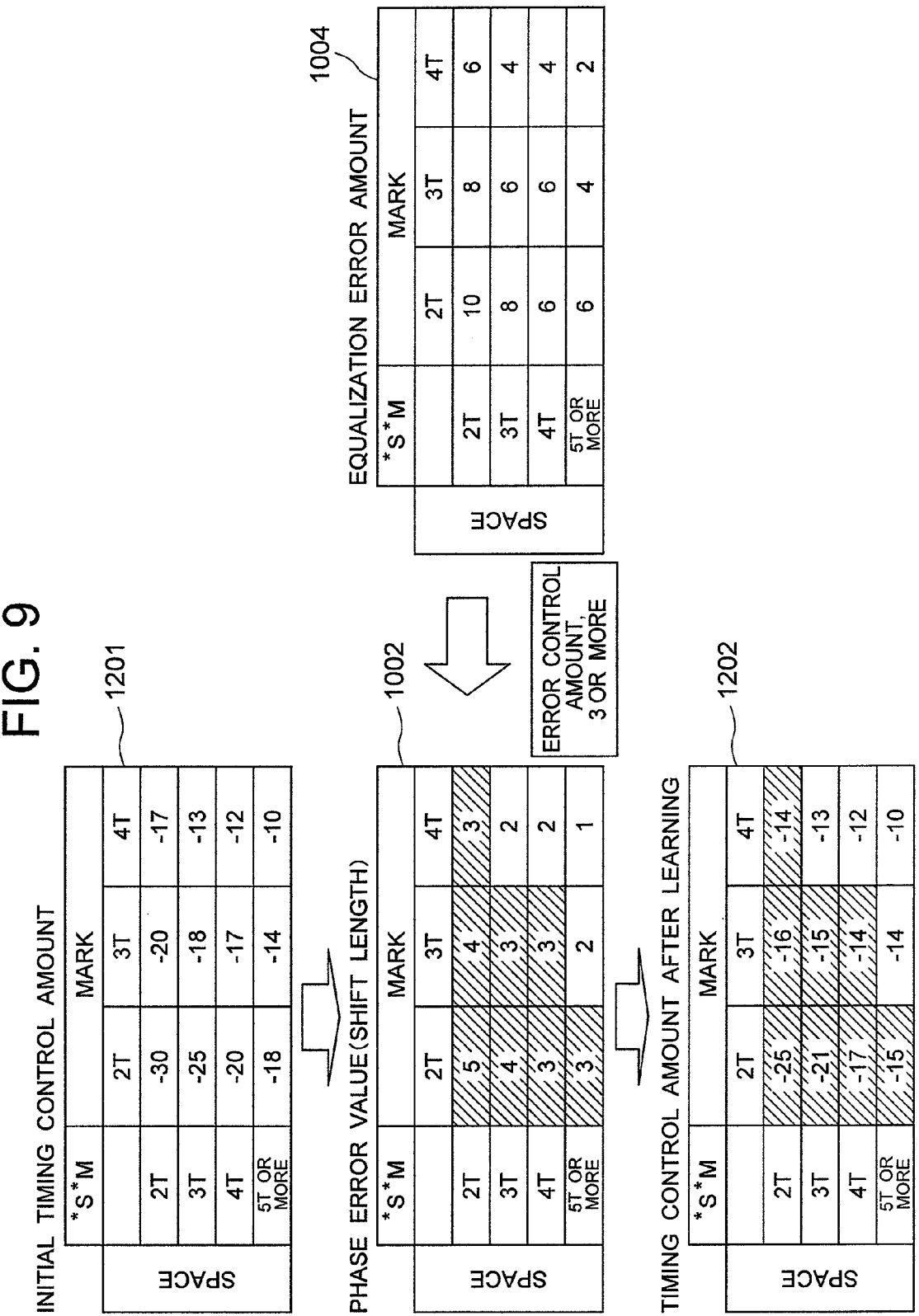
FIG. 9 is a diagram showing the process flow of the record parameter table according to the embodiment 1.
Figure 10:
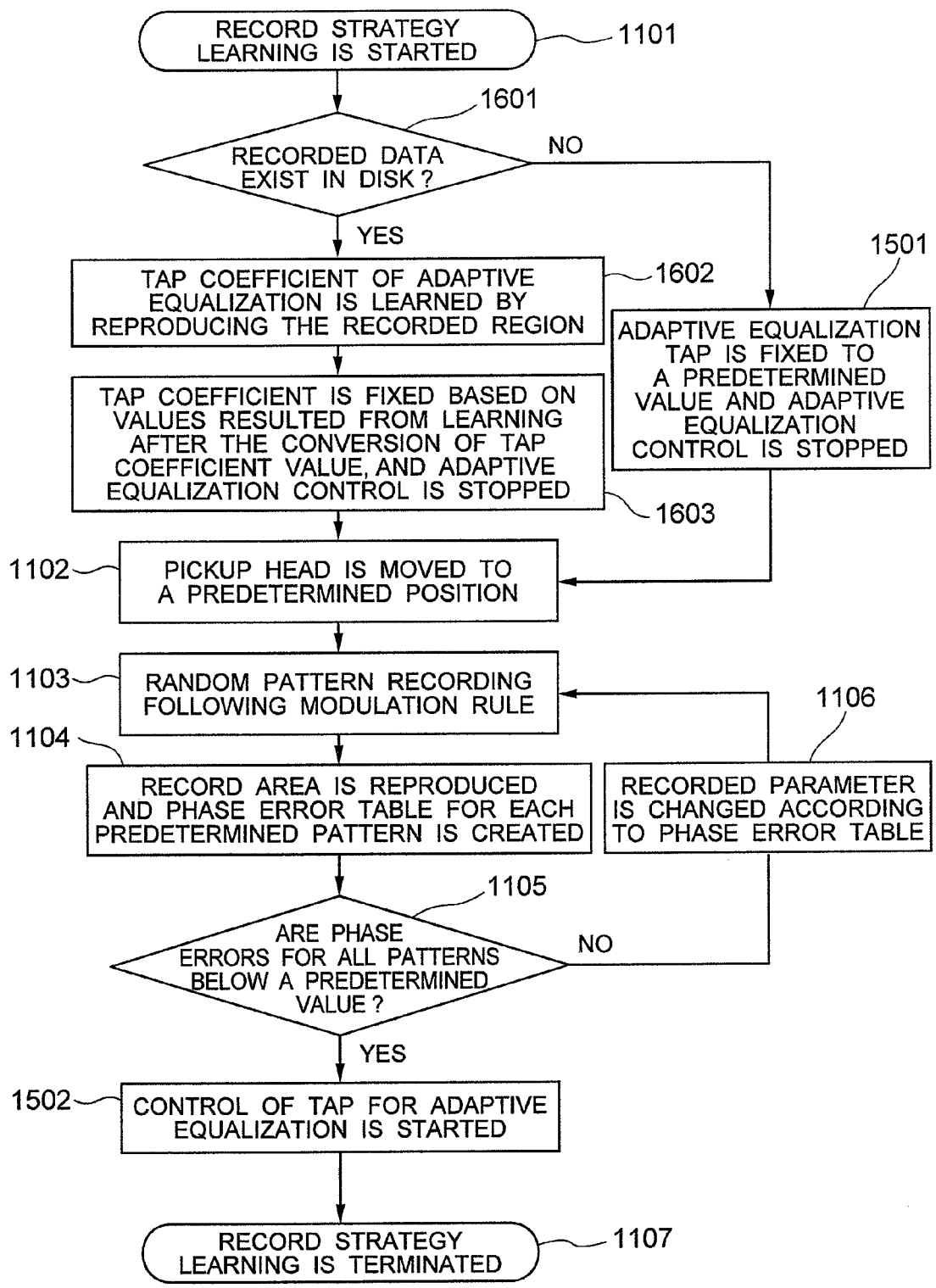
FIG. 10 is a flowchart showing the process flow of the record strategy learning according to an embodiment 2.

In the embodiment 1, a method is described in which a tap coefficient value is fixed to a coefficient value that satisfies, for example, PR (1, 2, 2, 1) at step 1501 in FIG. 8. However, the adaptive equalization circuit learns the tap coefficient depending the reproduced signals from the pickup head, the coefficient that satisfies the PR (1, 2, 2, 1) is sometimes not an optimum equalization value when the characteristics of the reproduced signal are different from those of the PR (1, 2, 2, 1). A flowchart is shown in FIG. 10 that shows the flow of processing for obtaining the optimum tap coefficient of the adaptive equalization circuit to implement the record strategy learning in such a case. In FIG. 10, same reference numbers are given to steps which perform the same processing as the corresponding steps shown in FIG. 8. Therefore, the description thereof is omitted here.

Steps in FIG. 10 that differ from those in FIG. 8 will be described in the following. After the record strategy learning is started, determination is made on whether recorded data exists in an optical disk apparatus (1601). If there exists the recorded data, then the data region is reproduced to perform learning of the tap coefficient of the adaptive equalization circuit (1602). If as a result of the learning, the conversion of the tap coefficient control is confirmed by checking the fluctuation of the tap coefficient, an equalization error output value or the like, then the tap coefficient is fixed to a value resulted from the learning and the tap coefficient control is stopped (1603). If there does not exist the recorded data in the optical disk, then the tap coefficient is fixed to a predetermined value as is the case with the embodiment 1, and the tap coefficient control is stopped (1501). The subsequent processings are the same as those of the embodiment 1.

The employment of the processing of the present embodiment can suppress the distortion or the like of the waveform, which is caused by a circuit characteristic in the former stage of the adaptive equalization circuit of the pickup head or the like, and execute the record strategy learning, thus making it possible to implement a highly compatible record strategy learning that does not depend on a reproductive circuit characteristic of each optical disk apparatus as well as an information record based on the mark and space.

(Embodiment 3)

In the embodiment 2, the recorded data is not especially specified. However, in order to correctly focus the tap coefficient of the adaptive equalization circuit so as to compensate the circuit characteristic, the recorded data is required to be of high quality. Therefore, it is preferable that reproduced data for performing the tap coefficient learning is employed that is recorded by an optical disk manufacturer's own apparatus or by a comparable one.

Figure 11:
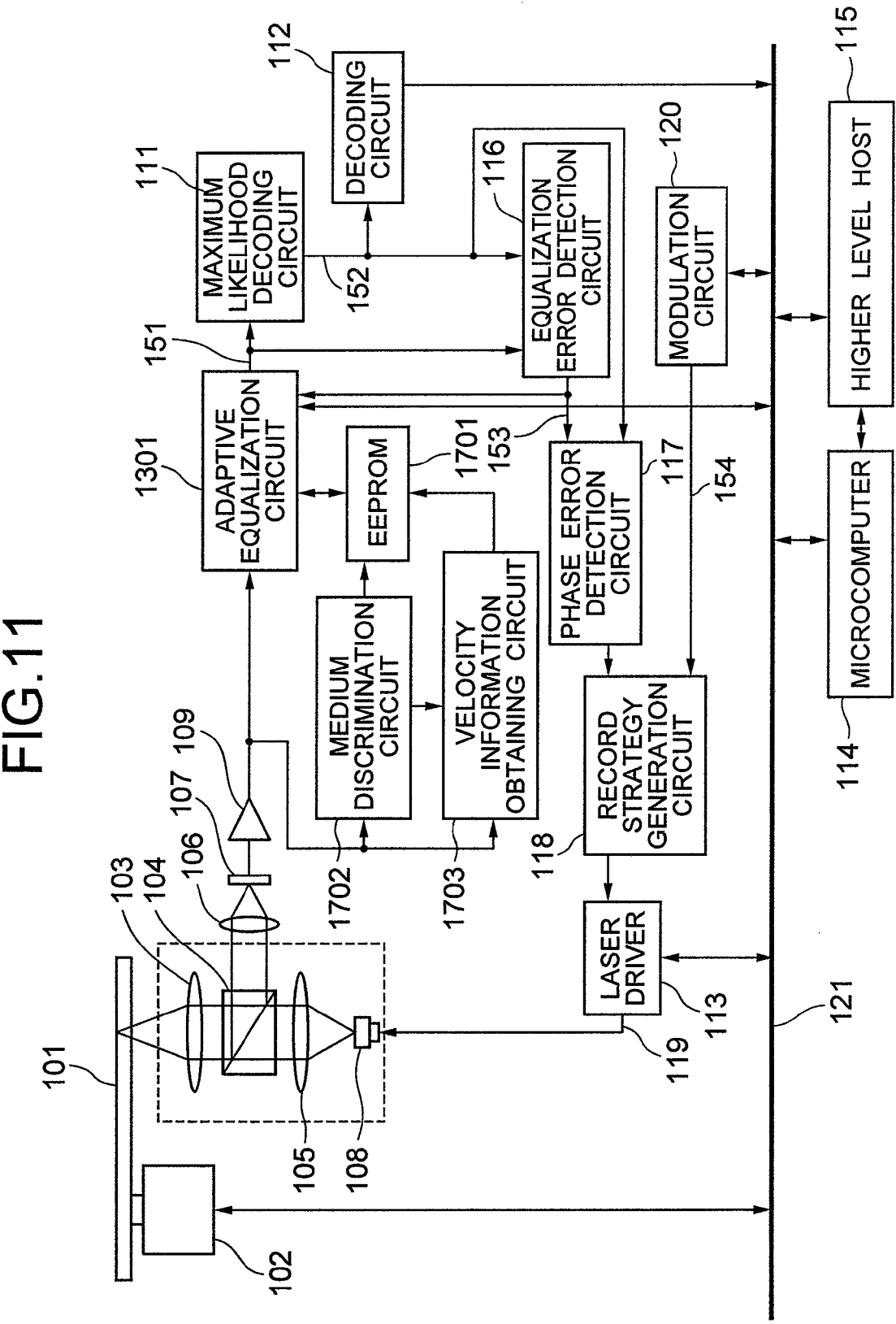
FIG. 11 is a block diagram of an optical disk apparatus according to an embodiment 3.

An optical disk apparatus according to an embodiment 3 of the present invention is shown in FIG. 11 as an example in which the foregoing is taken into consideration. In FIG. 11, blocks and elements with the same function as those shown in FIG. 1 are given the same reference numbers, and so the description thereof is omitted here.

1701 is a nonvolatile memory whose contents can be electrically rewritten, such as an EEPROM (Electrically Erasable and Programmable Read Only Memory). 1702 is a medium discrimination circuit. It discriminates the kind of optical disks, such as CD, DVD, and BD, from the information obtained from the reproduced signal, such as servo information. 1703 is a speed information obtaining circuit. It discriminates the reproduction speed of the optical disk from the information, such as a reproduced waveform or channel clock frequency generated from the reproduced waveform, and the discrimination result of the medium discrimination circuit 1702.

Figures 12, 13:
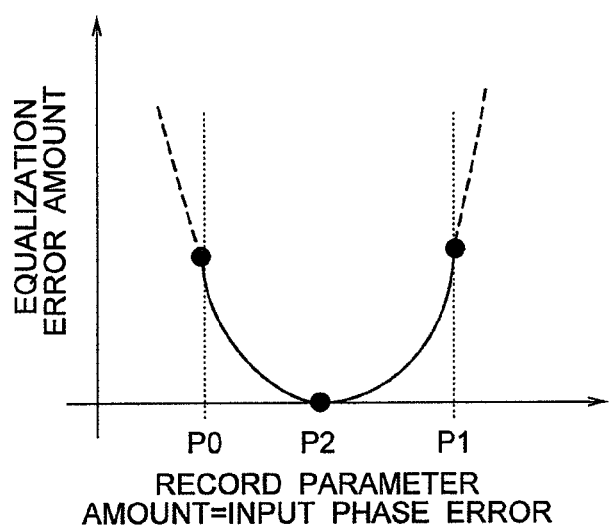
FIG. 12 is a diagram showing an exemplary data configuration of a nonvolatile memory according to the embodiment 3.
FIG. 13 is a schematic diagram showing the relation between a record parameter setting value and an equalization error amount.

An exemplary data configuration of the memory 1701 is shown in FIG. 12. The memory 1701 has areas where convergence values of the adaptive equalizing tap values are stored according to the kind of optical disks and reproduction speed as illustrated in FIG. 12. In each area thereof, medium information obtained from the medium discrimination circuit 1702, reproduction speed information obtained from the speed information obtaining circuit 1703, and tap coefficient convergence value are stored after a plurality kinds of optical disks, on which recording is performed by a standard optical disk apparatus, are inserted at a step, such as a step of inspecting the optical disk before shipment. The recording parameter learning is the same as that in the embodiments 1 and 2. However, for the predetermined value of the tap value of the processing 1502 in the embodiment 1, the tap values stored in the table of FIG. 12 are selected based on the outputs of the medium discrimination circuit 1702 and speed information obtaining circuit 1703.

In the optical disk apparatus of the present embodiment, it is possible to set an optimum equalizing characteristic corresponding to each condition and to improve the precision of the recording parameter learning by individually setting the tap coefficient of the adaptive equalization circuit according to each medium and reproduction speed during the recording parameter learning.

(Embodiment 4)

In the embodiments 1 to 3, the parameter control amount is derived from the output of the equalization errors, and the foregoing embodiments depend on the sensitivity for detecting the equalization errors. In contrast, the record parameter control needs only to search a record parameter which can obtain a minimum equalization error output irrespective of the sensitivity for detecting the equalization errors. As an embodiment 4, a recording parameter learning method for implementing the present method will be described with reference to FIG. 13 and FIG. 14. The optical disk apparatus for achieving the present embodiment can be implemented by the configuration of FIG. 1 shown in the embodiment 1, and the description thereof is omitted here.

FIG. 13 is a diagram showing the relationship between a parameter setting amount and an equalization error amount. As explained in the embodiment 1 with reference to FIG. 5 and FIG. 6, the phase error of waveform inputted into the waveform equalization circuit in the vicinity of edge point and equalization error output thereof are in the relationship of a monotonic increase and polarity holding. Therefore, when the phase error of the inputted waveform is changed by changing the record parameter, the same relationship is established between the record parameter setting amount and equalization error amount.

Figure 14:
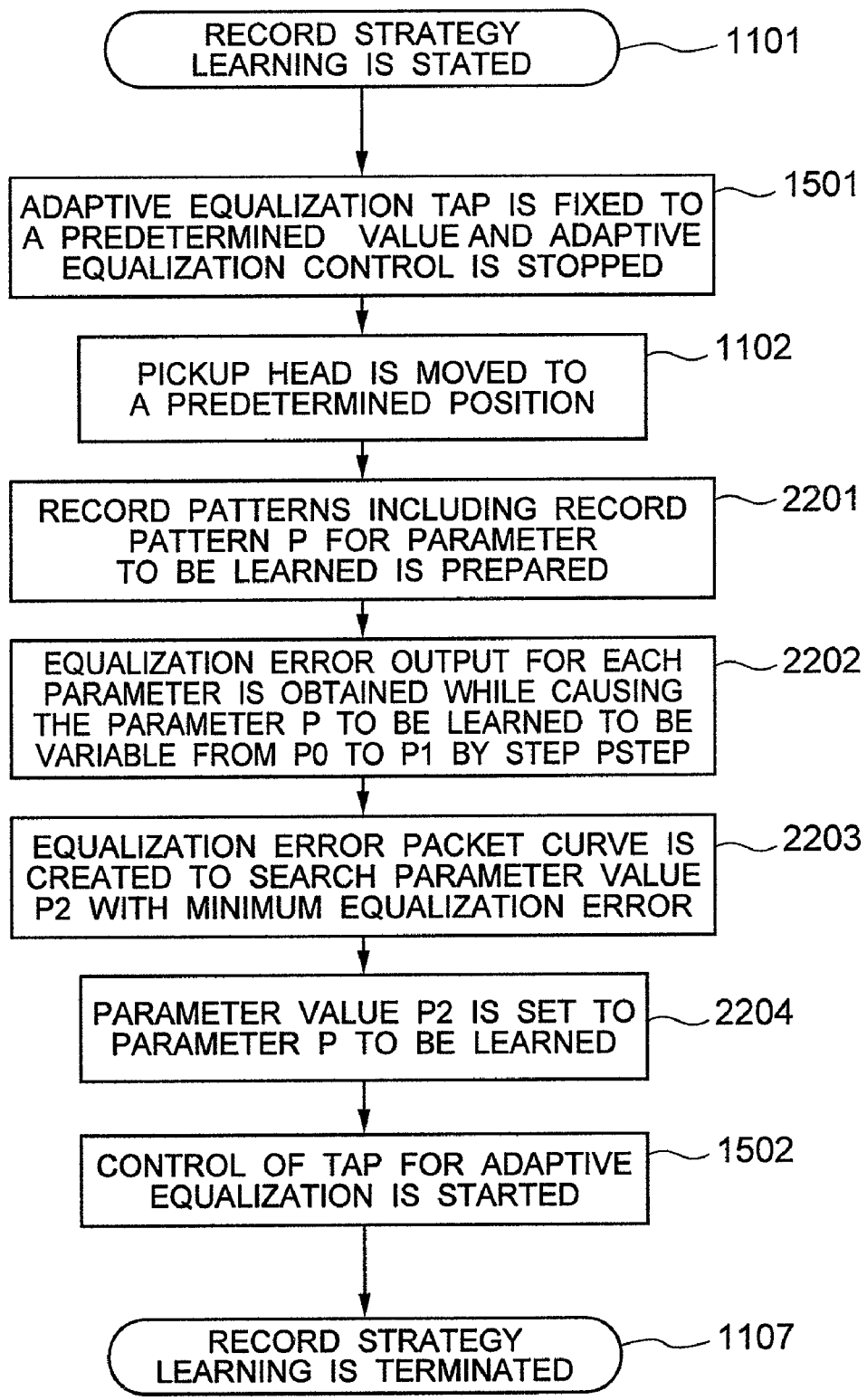
FIG. 14 is a flowchart showing the process flow of the record strategy learning according to an embodiment 4.

FIG. 14 is a flowchart showing the flow of the recording parameter learning in the present embodiment. In FIG. 14, same reference numbers are given to the steps which perform the same processing as the corresponding steps shown in FIG. 8. Therefore, the description thereof is omitted here. After the record strategy learning is started (1101), each tap coefficient of the adaptive equalization circuit 1301 is set to a predetermined value and the tap coefficient adaptation processing according to the equalization error output is stopped (1501). Then, after the pickup head is moved to a given position (1102), preparation is made for recording data patterns including a record parameter P to be learned (2201). More specifically, the recording preparation means to set the modulation circuit 120 of FIG. 1 such that it can generate a predetermined data pattern. Then, the record parameter to be learned is recorded and reproduced, while it is changed in a given step width Pstep, from a given value P0 to a given value P1 shown in FIG. 13, and equalization errors during reproduction in the recoding regions for each parameter setting are obtained (2202). The relationship shown in FIG. 13 is obtained from an obtained equalization error value group, and a record parameter value P2, in which the equalization error value becomes minimum, is searched (2204). When the searching is completed, the record parameter P2 is set to the parameter P (2204), the tap coefficient adaptation processing in the adaptive equalization circuit is resumed (1502), and then the record strategy learning is terminated (1107).

The present embodiment enables the optimum value learning of stable record parameter values to be performed even when the sensitivity for the equalization error and phase error changes due to the data pattern inputted into the waveform equalization circuit.

Figure 1:
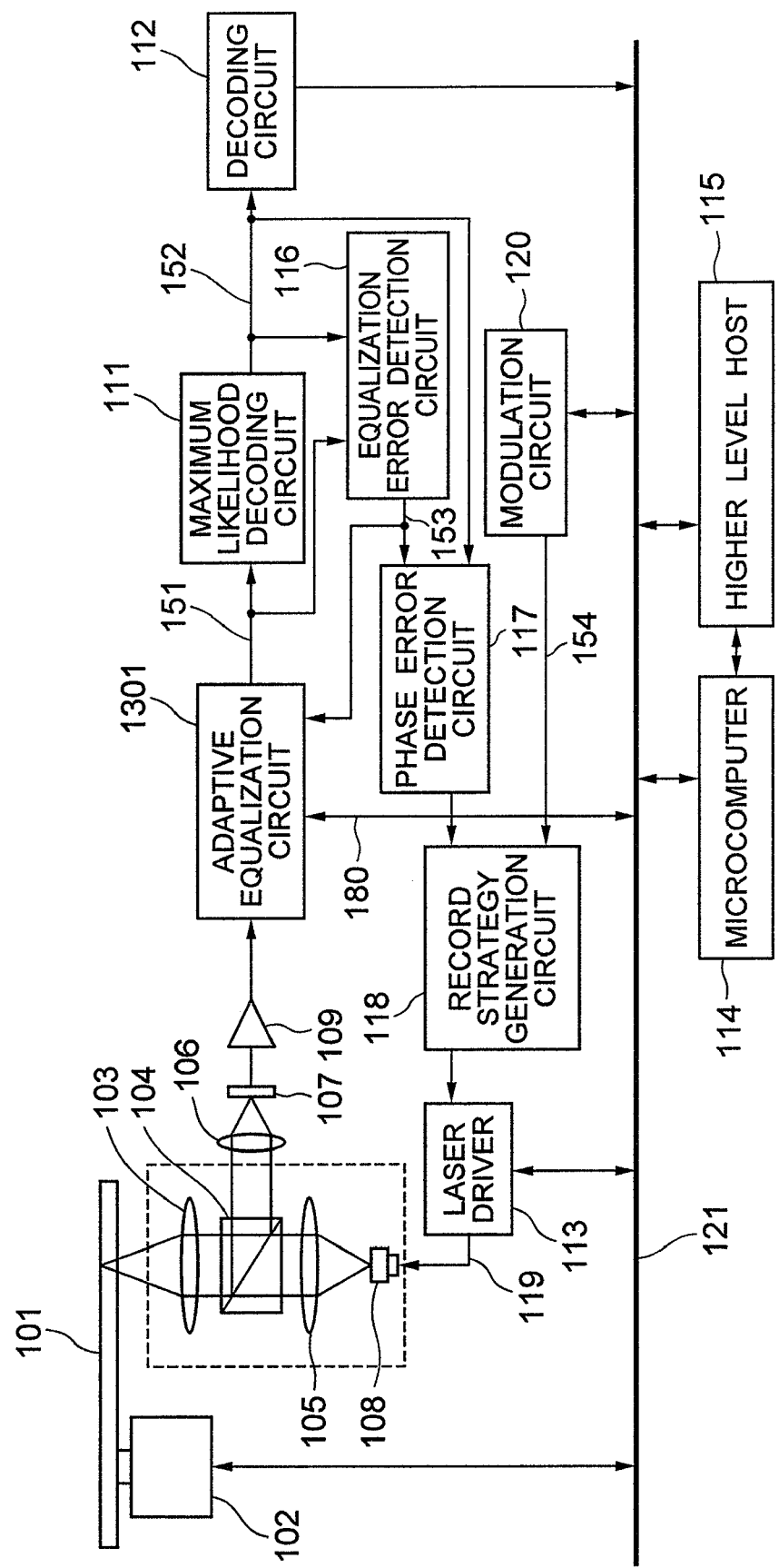
FIG. 1 is a block diagram of an optical disk apparatus according to an embodiment 1.

It should be noted that while the configuration of FIG. 1 used in the embodiment 1 is employed for the optical disk apparatus of the present embodiment, it goes without saying that the same effect will be obtained through the use of the configuration of the optical disk apparatus of the embodiments 2 and 3.

While an example of pulse timing control for determining a front edge record of the mark is shown as a record parameter of the recording laser pulse in the foregoing embodiments 1 to 4, the control of all laser pulse timings, including the pulse timing for determining a back edge record of the mark, is also applicable to the embodiments 1 to 4 in the same way.

Moreover, in the present embodiment, an example is shown in which a pulse timing parameter of the time axis error amount is obtained by searching a minimum phase error or a minimum jitter condition during the reproduction, as a learning target of the record parameter value. However, there is no limitation thereto. All record parameters related to the quality of reproduced data, including, a laser power parameter such as a record power or an erasure power, a data pattern mark during the strategy generation, a record clock for discriminating the space and the phase of the data pattern, can be learned by the same method.

(Embodiment 5)

Figure 15:
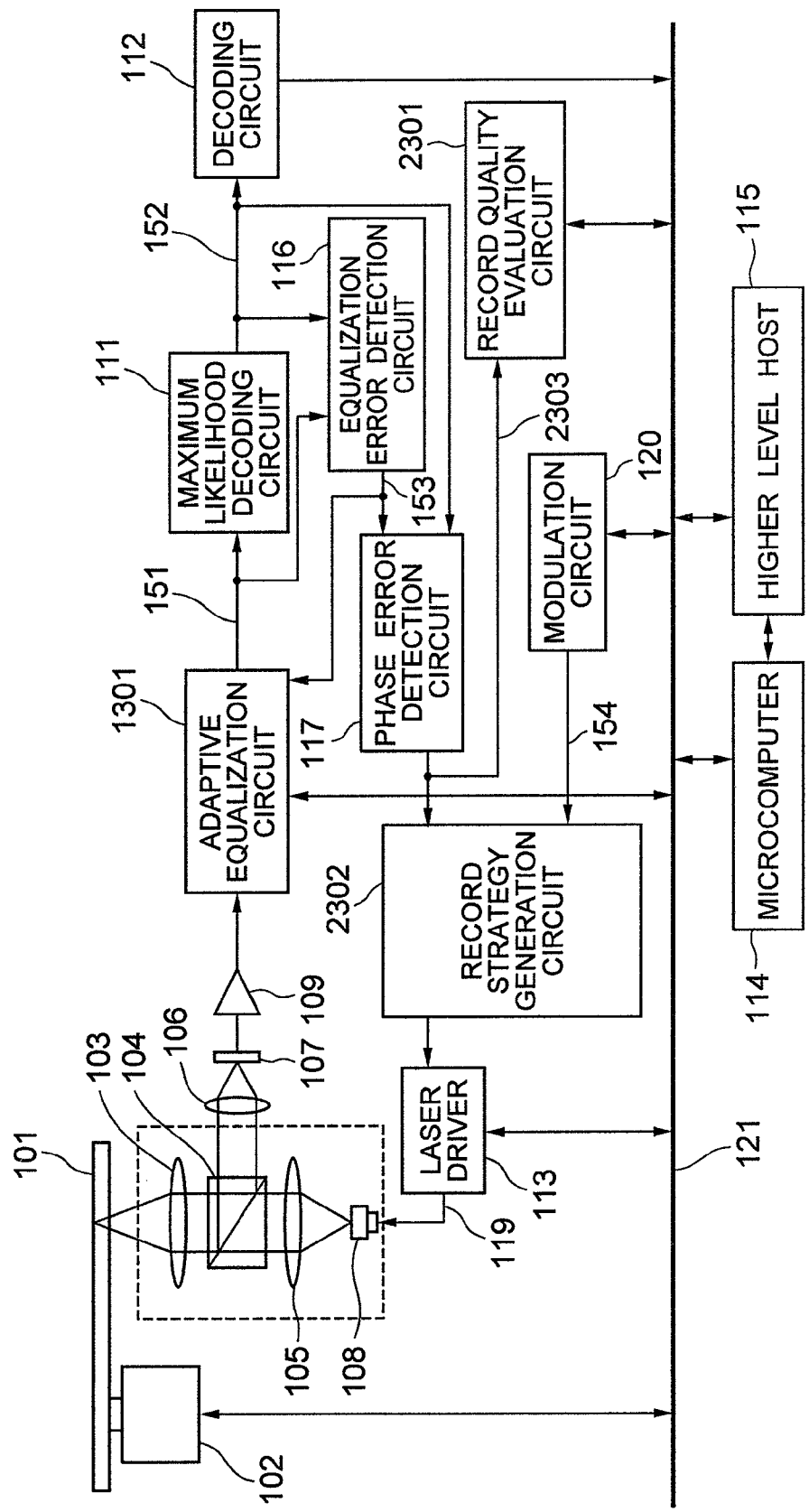
FIG. 15 is a block diagram of an optical disk recording apparatus according to an embodiment 5.

Next, an exemplary optical disk apparatus in which the present invention is applied to a record verification operation is shown in FIG. 15. In FIG. 15, the same reference numbers are given to circuit blocks and elements having the same functions as the corresponding circuit blocks and elements shown in FIG. 1. Therefore, the description thereof is omitted here. 2301 is a record quality evaluating circuit. The record quality evaluating circuit 2301 evaluates the quality of the record data from the value of an equalization error signal 153 which is detected by an equalization error detection circuit 116 during data reproduction after data recording, or from a phase error value 2303 which is outputted from a phase error detection circuit 117. If the quality falls below a certain reference value, which is describe later, then the record quality evaluating circuit performs an overwrite operation (re-recording) via a microcomputer 114 or the like, and instructs a strategy generation circuit 2302 to change the record parameter value based on the phase error value 2303. The operation of the present embodiment will be described in the following with reference to FIG. 15 and FIG. 16.

Figure 16:
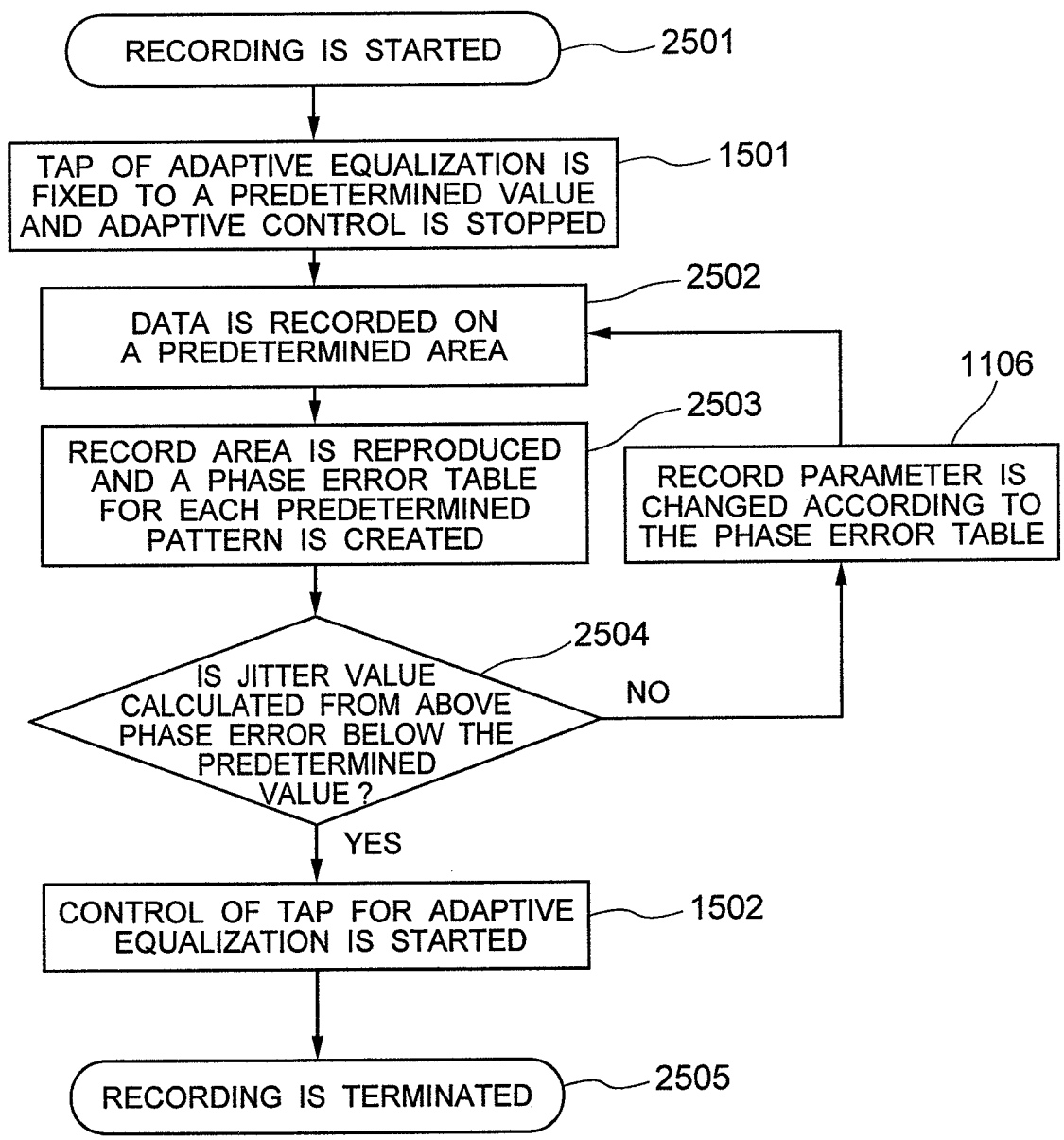
FIG. 16 is a flowchart showing the process flow of the record strategy learning according to the embodiment 5.

FIG. 16 is a flowchart showing the flow of processing during data recording according to the present embodiment. In FIG. 16, same reference numbers are given to the steps which perform the same processing as the corresponding steps of the embodiment 1 of the present invention shown in FIG. 8.

After a record operation is started by an instruction from a higher level host (2501), a tap coefficient of an adaptive equalization circuit is fixed to a predetermined value and the control of the adaptation equalization is stopped before data is recorded (1501). Then, data is recorded on a predetermined region of the optical disk specified by the higher level host (2502). Next, the area is reproduced to create a phase error table for each given pattern as is the case with the embodiment 1 (2503). A jitter value is calculated from the phase error distribution of the table to make comparison with a jitter value which is defined in the specification of the optical disk, on which recording is being performed, or a predetermined jitter value which is defined by the optical disk apparatus (referred to as a target jitter value) (2504). As a result, if the calculated jitter value exceeds a target value, then the record parameter is changed according to the phase error table as is the case with the embodiment 2 (1106), and the same region is recorded again (2502). If the calculated jitter value falls below the target jitter value, then the control of the adaptive equalization is resumed as is the case with the embodiment 1, and the recording is terminated (2505).

The foregoing processing enables the high precision evaluation of the record through the reproduction of the same speed using the maximum likelihood decoding circuit including the PRML in the record verification processing during high speed recording on the optical disk. It also enables the reduction of heat which is caused by motor torque during a change in the number of revolutions when changing the reproduction speed, and the reduction of a waiting time required until the rotation is corrected, thus making it possible to stabilize the recording operation and to reduce the recording time.

In the embodiments 1 to 5, a predetermined value is set to the tap coefficient of the adaptive equalization circuit, and the control thereof is stopped at the processing 1501. It should be noted, however, similarly in other waveform processing circuits that controls the parameter value depending on the reproduced waveform, a stable evaluation of the record quality is possible in the same manner as the foregoing tap coefficients of the adaptive equalization circuit by stopping the control during the recording parameter learning and verification operation.

Moreover, in the embodiment 1 to 5, PR (1, 2, 2, 1) is used as an equalization characteristic relative to the maximum likelihood decoding circuit. However, the present invention is applicable to the case where the system uses another PR characteristic, for example, PR (1, 2, 2, 2, 1), an equalization circuit corresponding thereto, and a maximum likelihood decoding circuit corresponding thereto, by obtaining the equalization errors in the same manner. There is no limitation to the PR class (PR characteristic).

It should be further understood by those skilled in the art that although the foregoing description has been on embodiments of the invention, the invention is not limited thereto and various change and modifications may be made without departing from the spirit of the invention and the scope of the appended claims.

The invention claimed is:

1. An optical disk apparatus comprising:
a laser configured to irradiate an optical disk with laser light;
a laser driver configured to supply the laser with a laser driving current;
a reproduced waveform processing circuit configured to optimally control a transmission characteristic and parameters in binarization determination for a signal reproduced from said optical disk, and configured to stop when a record strategy generation circuit is processing;
an equalization error detection circuit configured to obtain an equalization error signal by using the transmission characteristic and the parameters in binarization determination;
a phase error detection circuit configured to obtain a phase error by using an equalization error signal obtained by the equalization error detection circuit;
the record strategy generation circuit configured to determine an optimum record strategy by writing data as a trial on a predetermined region of said optical disk and reproducing said data written as a trial such that the phase error between a waveform of the reproduced data and a channel clock is less than or equal to a predetermined quantity, and configured to supply the laser driver with information indicating the optimum record strategy.

2. The optical disk apparatus according to claim 1, wherein said reproduced waveform processing circuit comprises:
an adaptive equalization circuit configured to adaptively equalize the signal reproduced from said optical disk using a plurality of variable tap coefficients and to output an equalized signal; and
a maximum likelihood decoding circuit configured to input said equalized signal and to output the binarized signal; and
wherein said reproduced waveform processing circuit is configured to fix at least one of said tap coefficients of said adaptive equalization circuit while learning is controlled by said record strategy generation circuit.

3. The optical disk apparatus according to claim 2, wherein said reproduced waveform processing circuit is configured to fix at least one of said tap coefficients during determination of an optimum record strategy, and is configured to cause at least one of said tap coefficients to be variable except during determination of an optimum record strategy.

4. The optical disk apparatus according to claim 2, further comprising:
an equalization error detection circuit is configured to detect equalization errors in said adaptive equalization circuit; and
a switch configured to switch an input supply to said adaptive equalization circuit from said equalization error signals to zero values, and vice versa.

5. The optical disk apparatus according to claim 4, wherein said reproduced waveform processing circuit is configured to control said switch to supply a zero value to said adaptive equalization circuit during determination of an optimum record strategy, and to otherwise supply said equalization error signal to said adaptive equalization circuit.

6. The optical disk apparatus according to claim 2, wherein said record strategy generation circuit is configured to perform determination of an optimum record strategy again when a phase error, which is observed during determination of an optimum record strategy, exceeds a predetermined value.

7. An optical disk apparatus comprising:
a laser configured to irradiate an optical disk with laser light;
a laser driver configured to supply the laser with a laser driving current;
a reproduced waveform processing circuit configured to optimally control a transmission characteristic and parameters in binarization determination for a signal reproduced from said optical disk;
a phase error detection circuit configured to obtain a phase error by using an equalization error signal; and
a record strategy generation circuit configured to determine an optimum record strategy by writing data as a trial on a predetermined region of said optical disk and reproducing said data written as a trial such that the phase error between a waveform of the reproduced data and a channel clock is less than or equal to a predetermined quantity, and configured to supply the laser driver with information indicating the optimum record strategy;
wherein a control by said reproduced waveform processing circuit is stopped during a determination of an optimum record strategy.

8. The optical disk apparatus according to claim 7,
wherein the reproduced waveform processing circuit configured to optimally control the transmission characteristic and the parameters binarization comprises:
an adaptive equalization circuit configured to adaptively equalize the signal reproduced from said optical disk using a plurality of variable tap coefficients and to output an equalized signal, and
a maximum likelihood decoding circuit in which said equalized signal is assumed to be an input and the binarized signal is assumed to be an output; and
wherein a tap coefficient of above adaptive equalization circuit is fixed during said determination of an optimum record strategy.

9. The optical disk apparatus according to claim 8,
wherein said optical disk apparatus further comprises:
an equalization error detection circuit is configured to detect equalization errors in said adaptive equalization circuit, and
a switch configured to supply said adaptive equalization circuit with said equalization error signals or zero values by switching; and
wherein said switch is controlled to supply a zero value during determination of an optimum record strategy and to supply said equalization error signal except during determination of an optimum record strategy.

10. The optical disk apparatus according to claim 8, wherein determination of an optimum record strategy is performed again when the phase error which is observed during determination of an optimum record strategy exceeds a predetermined value.

* * * * *